US006246981B1

(12) United States Patent
Papineni et al.

(10) Patent No.: US 6,246,981 B1
(45) Date of Patent: Jun. 12, 2001

(54) NATURAL LANGUAGE TASK-ORIENTED DIALOG MANAGER AND METHOD

(75) Inventors: Kishore A. Papineni, Yonkers; Salim Roukos, Scarsdale; Robert T. Ward, Croton-on-Hudson, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,098

(22) Filed: Nov. 25, 1998

(51) Int. Cl.[7] ............................ G10L 15/26; G10L 15/22

(52) U.S. Cl. ............................................ 704/235; 704/275

(58) Field of Search .................................... 704/275, 270, 704/235; 706/61

(56) References Cited

U.S. PATENT DOCUMENTS

| | | | | |
|---|---|---|---|---|
| 5,168,548 | * | 12/1992 | Kaufman et al. .................... | 704/200 |
| 5,231,670 | * | 7/1993 | Goldhor et al. ..................... | 704/275 |
| 5,577,165 | | 11/1996 | Takebayashi et al. . | |
| 5,694,558 | * | 12/1997 | Sparks et al. . | |
| 5,748,974 | * | 5/1998 | Johnson . | |
| 5,970,448 | * | 10/1999 | Goldhor et al. ..................... | 704/235 |
| 5,999,904 | * | 12/1999 | Brown et al. . | |
| 6,003,020 | * | 12/1999 | Hazlehurst et al. . | |
| 6,044,347 | * | 5/2000 | Abella et al. . | |
| 6,073,102 | * | 6/2000 | Block . | |
| 6,094,635 | * | 7/2000 | Scholz et al. . | |
| 6,125,347 | * | 9/2000 | Cote et al. ........................... | 704/275 |

FOREIGN PATENT DOCUMENTS

| | | | | |
|---|---|---|---|---|
| 0123456 A2 | * | 1/2000 | (EP) ..................................... | 100/100 |

OTHER PUBLICATIONS

IBM Technical Disclosure NN85057034 "Invoking Inference Engines in an Expert System" May 1985.*

A.L. Gorin et al "How may I help you?" Proc. 3rd Workshop on Interactive Voice Technology, Nov. 1, 1996, pp. 57–60.*

J. Choobineh et al. "An expert database design system based on analysis of forms" IEEE Trans Software Engineering, pp. 242–253 Feb. 1988.*

Bobrow et al., "GUS, A Frame–Driven Dialog System," Artificial Intelligence, vol. 8, pp. 153–173, 1977.

Denecke et al., "Dialogue Strategies Guiding Users to Their Communicative Goals," ISSN, 1018–4074, pp. 1339–1342.

Pieraccini et al., "AMICA: the AT&T Mixed Initiative Conversational Architecture," ISSN, 1018–4074, pp. 1875–1878.

Levin et al., "Using Markov Decision Process for Learning Dialogue Strategies," ICASSP–98, vol. 1, pp. 201–204.

Goddeau et al., "A Form–Based Dialogue Manager for Spoken Language Applications," Proceedings of International Conference on Spoken Language Processing, Oct. 1996, pp. 701–704.

Ratnaparkhi, "A Linear Observed Time Statistical Parser Based on Maximum Entropy Models," Proceedings of the Second Conference on Empirical Methods in Natural Language Processing, Aug. 1997.

* cited by examiner

*Primary Examiner*—Tālivaldis I. Šmits
(74) *Attorney, Agent, or Firm*—F. Chau & Associates, LLP

(57) ABSTRACT

A system for conversant interaction includes a recognizer for receiving and processing input information and outputting a recognized representation of the input information. A dialog manager is coupled to the recognizer for receiving the recognized representation of the input information, the dialog manager having task-oriented forms for associating user input information therewith, the dialog manager being capable of selecting an applicable form from the task-oriented forms responsive to the input information by scoring the forms relative to each other. A synthesizer is employed for converting a response generated by the dialog manager to output the response. A program storage device and method are also provided.

36 Claims, 6 Drawing Sheets

NATURAL LANGUAGE TASK-ORIENTED DIALOG MANAGER AND METHOD

BACKGROUND OF THE INVENTION

1. Field of the Invention

The present invention relates to speech recognition and synthesis systems and, more particularly, to a natural language task-oriented dialog manager and method for providing a more versatile interface for interacting with users.

2. Description of the Related Art

Conversational systems are generally task-oriented. This means that their role is to help users achieve a specific goal in a particular application domain. A weather inquiry conversational system will provide users information about weather reports and forecasts for a specific geographic location, but will not be able to conduct philosophical debates with the user. Moreover, a weather inquiry system is not expected to understand user's queries about stock prices, let alone answer them. That is, these systems are domain-specific.

Even as these systems are task-oriented and domain-specific, they can be quite flexible within their domains. They are expected to handle queries in the domain expressed freely in natural language. The input and output could be either text-oriented or speech-oriented. Speech-oriented systems have a speech recognition subsystem (speech-to-text system) and a speech synthesis subsystem (text-to-speech system).

Both mixed-initiative and machine-initiative approaches to task-oriented dialog management can be found in the prior art. There are two principal ways of implementing dialog managers.

One way is to define a finite number of states in which dialog can be, and describe what actions by the user or the computer at a given state will change the dialog state to another. All the actions for state transitions are predefined for every pair of states. The designer of the application decides what these states are, and what user actions cause the transitions and the computer response in its turn upon these state transitions. The dialog manager's behavior is completely specified by a state table. Developing applications using this strategy is very laborious, complicated, and may be untenable for all but the simplest applications. Since the dialog manager is virtually the same as the state table, the dialog manager itself is not portable across applications. Such state-table based dialog managers typically are machine-initiative dialog managers, directing the dialog.

An example of a state-based dialog system is described in U.S. Pat. No. 5,577,165, "Speech Dialogue System for Facilitating Improved Human-Computer Interaction", to Takebayashi et. al., issued Nov. 19, 1996.

There are recent improvements in the state-based dialog management. The publication "AMICA: the AT&T Mixed Initiative Conversational Architecture" by R. Pieraccini, E. Levine, and W. Eckert in the Proceedings of Eurospeech-97, Rhodes, Greece, 1997, vol 4, pp. 1875–1878 (Pieraccini et al.), describes a dialog system architecture that is based on a dialog state space, an action set, and a dialog strategy. The dialog state corresponds to all the information available at a certain time during the course of dialogue. The action set is the set of all actions that the dialog system can perform (such as asking the user for input, providing the user some output, and performing data retrieval from a database). The dialog strategy in Pieraccini et al. specifies the action to be performed next for each state reached. The implementation of the strategy is represented by a recursive transition network whose arcs represent conditions on the state, and whose nodes represent the actions. The dialogue system operates in the following manner: based on the current state, identify a particular node in the network, invoke the action associated with the node (the action updates the dialog state), move to the next state depending on the state resulting from applying the action. The design of the dialog strategy can pose an optimization problem which can be solved by a reinforcement learning approach as described in "Using Markov Decision Process for Learning Dialogue Strategies", by E. Levin, R. Pieraccini, and W. Eckert, in the Proceedings of the International Conference on Acoustics, Speech, Signal Processing, Seattle, May 1998, vol 1, pp. 201–204.

Another approach to dialog management is based on "frames". Frames are the electronic equivalent of forms that are filled in any bureaucratic process. These "electronic forms" ("forms" hereinafter) have slots that correspond to information supplied by the user. For example, an airline travel form will have a slot for departure date, a slot for departure location and a slot for arrival location. There may be additional slots for optional information like airline name. When the user provides information, it is used to fill the slots in the form. The information corresponding to the slots can be provided by the user in any order. If any vital slot is unfilled, the machine will ask the user for the value of that field (slot). In this way, mixed-initiative is achieved. A first example of such a system is "GUS: A Frame-driven Dialog Manager" by Bobrow et al, published in Artificial Intelligence, vol 8 (1977), pp. 155–173. This work describes dialog management of just one task; booking an airline ticket. This means there is only one active form.

Another recent example is "A Form-based Dialog Manager for Spoken Language Applications" by D. Goddeau, H. Meng, J. Polifroni, S. Seneff, and S. Busayapongchai, in Proceedings of the International Conference on Spoken Language Processing, Philadelphia, 1996, pp. 701–704. This work describes dialog management in the domain of used car price quotes. Again, there is only one task and one active form corresponding to that task.

Yet another approach to dialog processing is an information-based approach of "Dialogue Strategies Guiding Users to their Communicative Goals", by Matthias Denecke and Alex Waibel, published in Proceedings of Eurospeech-97, Rhodes, Greece, 1998, pp. 1339–1342. By information-based approach, it is meant that the specificity of the information comprising results from database retrieval determines the actions to be undertaken by the dialogue system. They represent each of users' communicative goals by a typed feature structure (a domain-specific object) in which the feature values impose lower bounds on the data fields required for the goal. The main goal of this approach is to generate clarification dialogues by determining which questions to ask the user in case the user does not specify all the necessary information for a goal. The sequence of questions asked are expected to elicit answers from users to fill initially deficient feature structure step by step, thus generating a feature structure that meets the information lower bound of a communicative goal.

Poor recognition, silence, requests for help, cancellation, list-navigation, and requests for repetition of last response are some issues of dialog management that are common for all applications and domains. Processing these events or requests are referred to as domain-independent processing.

Therefore, a need exists for a dialog manager which is more versatile in interacting with a user. A further need exists for a dialog management system which responds to information on a wide range of topics in natural language and is easily adaptable to new tasks. A still further need exists for a method of interacting with a single user on a plurality of topics.

SUMMARY OF THE INVENTION

A system for conversant interaction includes a recognizer for receiving and processing input information and outputting a recognized representation of the input information. A dialog manager is coupled to the recognizer for receiving the recognized representation of the input information, the dialog manager having task-oriented forms for associating user input information therewith, the dialog manager being capable of selecting an applicable form from the task-oriented forms responsive to the input information. A synthesizer is employed for converting a response generated by the dialog manager to output the response.

In alternate embodiments, the dialog manager is preferably controllable through a backend and a script for determining a behavior for the dialog manager. The recognizer may include a speech recognizer for recognizing speech and outputting recognized text. The recognized text is preferably output to a natural language understanding module for interpreting natural language supplied through the input. The synthesizer may be a text to speech synthesizer. The task-oriented forms may each correspond to a different task in the application, each form including a plurality of fields for receiving data supplied by a user at the input, the fields corresponding to information applicable to the application associated with the form. The task-oriented form may be selected by scoring the forms relative to each other according to information needed to complete each form and the context of information input from a user. The dialog manager may include means for formulating questions for one of prompting a user for needed information and clarifying information supplier by the user. The dialog manager may include means for confirming information supplied by the user. The dialog manager may include means for inheriting information previously supplied in a different context for use in a present form.

A program storage device readable by machine, tangibly embodying a program of instructions executable by the machine to perform method blocks for managing dialog for speech recognition systems, the method blocks including assembling attributes and values in pairs based on a semantic representations of input speech, processing semantic representations to determine a plurality of admissible forms in accordance with pairs of attributes and values, scoring the admissible forms to determine which form is most relevant and responsive to the pairs of attributes and values and thereby being responsive to input speech and sending messages to be output in accordance with the input speech and the context of the input speech in accordance with the most relevant form.

A method for managing dialog for speech recognition systems includes the steps of assembling attributes and values in pairs based on a semantic representations of input speech, processing semantic representations to determine a plurality of admissible forms in accordance with pairs of attributes and values, scoring the admissible forms to determine which form is most relevant and responsive to the pairs of attributes and values and thereby being responsive to the input speech and sending messages to be output in accordance with the input speech and the context of the input speech in accordance with the most relevant form.

In alternate embodiments/methods, the following steps may be included. The forms may include slots for receiving information therein and the step of scoring the admissible forms may include the step of scoring the admissible forms based on a number of filled and unfilled slots. The step of sending messages may include the step of sending confirmation messages to a user prior to executing a task. The device/method may include a domain of relevant forms and may further include the step of determining whether the input speech is domain independent and responding appropriately to the user when the information input is domain independent. The step of comparing a score of the most relevant and responsive form to a threshold value to determine if input speech is properly received may also be included. The step of sending a message to a user to rephrase the input speech may be included. The input speech and output messages may be in natural language. The step of inheriting the pairs of attributes and values from previously filled slots of previously most relevant and responsive forms based on context of input speech may be included.

The step of enabling a user to shift context naturally allowing the user to address any task at any time may also be included. The step of dynamically switching between machine-initiative and mixed-initiative modes by managing a list of admissible forms is preferably included. The step of canceling by speech input at any time at least one of a current transaction and any previous transaction may be included. The step of providing a context-sensitive help function accessible during operation may be included. The step of providing a user with a capability for navigating lists of items presented to the user in response to input speech is also preferably provided.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
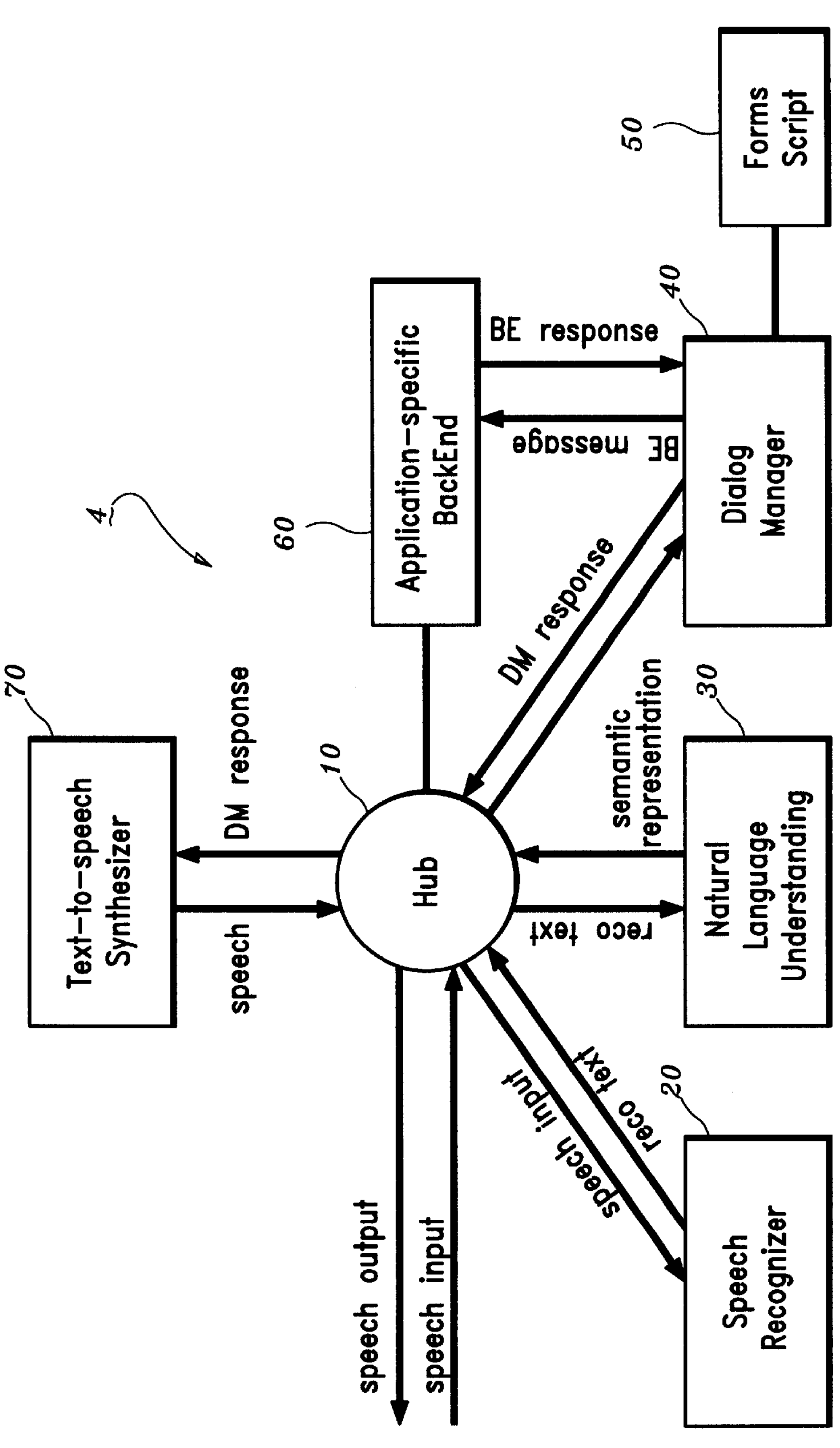
FIG. 1 is a block diagram for a conversational system in accordance with the present invention.

The present invention relates to speech recognition and synthesis systems and, more particularly, to a natural language task-oriented dialog manager and method for providing a more versatile interface for interacting with users. A task-oriented dialog manager in accordance with the invention performs tasks according to user's request. To perform the tasks, a computer/machine may need many pieces of information. The user may not always supply all pieces of information in one turn of the conversation. The computer/machine needs to query the user for missing information. Often, the user may have only a partial knowledge about the data the machine is expected to manipulate and therefore may supply ambiguous information, and the machine needs to clarify such information. The machine may also have to inherit information latent in the context and confirm such inheritance with the user. Before performing critical tasks (like transferring money between user's accounts), the computer is expected to report to the user what it is about to perform and confirm the transaction with the user. Query, clarification, inheritance, and confirmation are common steps involved in dialog management no matter what the task is.

A conversational system in accordance with the invention includes a dialog manager. The input to the dialog manager is typically a context-independent semantic representation of the user's turn (text or speech). The dialog manager keeps track of the history of the conversation, interprets its input in context, identifies the intention of the user, checks to see if it can perform the transaction, and constructs an output as a response to the user.

Users may want assistance on how to use the system in general or how to perform a task in particular. Users may ask for help specifically on a topic or simply request assistance in the middle of a providing information for a transaction, for example. The dialog manager provides context-dependent and detailed help to the user.

Users are able to cancel a transaction at any time during the transaction. The dialog manager also handles cancellation requests. The dialog manager handles such events as "time-out" or silence (i.e, the user not responding for a reasonable duration of time), and/or poor speech recognition in case of speech-based applications.

When users request information that turns out to be a lengthy inquiry or needs a lengthy list (for example, the list of all flights from New York to Chicago), the dialog manager presents the list in a reasonable manner—often in small chunks with provision for the user to navigate the list.

The present invention addresses the above issues. A dialog manager allows the user to volunteer information on his/her own initiative. Conversely, when vital information is not provided by the user, the dialog manager takes the initiative and asks for the information. Dialog managers that accommodate both human initiative and machine initiative are called mixed-initiative dialog managers. The dialog manager of the present invention is a mixed-initiative dialog manager, but may also operate in machine-initiative mode. Mixed-initiative is sharply contrasted with machine-initiative where the dialog manager directs the dialog and expects the user to respond briefly and to the question. Machine-initiative mode is also called "directed dialog" mode. While a machine-initiative dialog manager may allow the user to volunteer more information than asked for, the dialog still tends to be stilted, rigid, and inefficient.

The present invention relates to task-oriented human-computer natural language conversational systems. Examples of such systems may include those that provide stock prices, weather reports, or make airline reservations while interacting with their users in natural language. Such computer systems may have natural language sentences as part of their input and produce natural language sentences as part of their output. Either the input or the output may also be augmented with non-linguistic phenomena such as mouse clicks or graphics. The invention includes natural language input and output. The input can be natural language text typed or handwritten by the user or it could be the output of a speech recognition system whose input in turn is the user's speech.

The dialog manager of the present invention may be form-based. However, multiple forms may be used simultaneously, each corresponding to a task in a domain of tasks. The present invention's dialog manager permits users to address any task any time. This means, the dialog manager does not know a priori which form corresponds to the user's turn (utterance). The task of the dialog manager is then to determine the best form that corresponds to the user's intention.

The dialog manager of the present invention is not state-based. Further, the present invention is to be contrasted with the information-based approach in the following way. In the present invention, the users are allowed to shift focus any time, by choosing not to answer the dialog manager's questions and/or by addressing a different task altogether. The dialog manager of the present invention does not ask a clarification question as to what task the user intends to perform, but assigns a task that matches best to a user's utterance based on a scoring function. The dialog manager then asks a clarification question if there is ambiguity in the data fields associated with the task, or it requests missing information.

For the present invention, there is no explicit representation of dialog state. Forms are only roughly comparable to typed feature structures. Forms do not assume that there is a type hierarchy on which informational bounds can be placed. The scoring of forms is entirely dissimilar to choosing feature paths based on maximum entropy as described in the prior art.

One aspect of the present invention is modeling the user intention on every turn. That is, the dialog manager does not assume that the user continues to address each task until the task is finished or cancels it explicitly. This means that the dialog manager does not impose any restriction on the user insofar as selection of tasks is concerned. This implies that the dialog manager can always evaluate the suitability of each task to user's input. This is achieved in the present invention by associating a score to each form as a measure of matching between the form and the user's input. Then the best scoring form corresponds to user's intention.

Another aspect of the present invention is that the invention provides means for an application developer to describe the behavior of the dialog manager and hence the application itself in a simple declarative manner in a text file. This text file is read by the dialog manager at run time. This text file (called "script" hereinafter) includes the specification of all forms in the domain. Each form corresponds to a task in the application domain. This file determines the functionality of the entire application in that it specifies what tasks users can address in the domain. A simplified example segment of a script (with minor modifications to syntax for the purpose of simplification) that is used by the current dialog manager in an application is shown in Appendix A.

The dialog manager of the present invention is "application-blind". That is, the same dialog manager may be used to build, for example, a banking application, a stock quotes system, or a weather report system, among other applications. All these applications often have proprietary software dealing with their own databases. The dialog manager is not preprogrammed with any knowledge about these databases. Such application-specific software is referred to as a backend in this disclosure.

The interaction between the dialog manager and the backend is preferably specified in the script. Since each form corresponds to a task in the application domain, each form has a backend command associated with the form. In this way, the current invention separates the process of managing the dialog from the backend transactions themselves.

Another aspect of the dialog manager of the present invention is its ability to dynamically switch between machine-initiative mode and mixed-initiative mode. The dialog managers in the prior art are either mixed-initiative dialog managers or machine-initiative dialog managers. The current invention's dialog manager can be started in either mixed-initiative or machine-initiative mode. The dialog manager may switch to machine-initiative mode whenever it decides that the user needs more assistance. The dialog manager may switch back to the previous mode when assistance is no longer necessary. Maintaining and modifying a list of currently admissible forms is implemented such that the dialog mode is dynamically adapted.

It should be understood that preferred embodiments of the present invention will be explained in terms of telephony conversational system. However, the invention is not limited to a telephony environment. Rather, the methods and systems described herein are broadly applicable to any dialog management system involving user input means and user output means. For example, the dialog manger may be used in a text-only situation where the user types text into a window and the dialog manager writes its response back to a window. Another implementation may be where the user types or writes into a window as well as select objects by using a mouse and the dialog manager sends text as well as graphical data into possibly separate windows. Those skilled in the art will recognize that the invention may be applied to various other domains.

It should be understood that the elements shown in FIGS. 1–6 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow diagram of one form of a conversational system/method 4 using the present invention is shown. The conversational system 4 includes a hub or control center 10, a speech recognizer 20, a Natural Language Understanding unit 30, a dialog manager 40, a script 50, an application-specific backend 60, and a text-to-speech synthesizer 70.

The hub 10 is operatively coupled to various other modules and to control and interact with the other modules. The hub 10 initializes each of these modules. Specifically, the hub 10 initializes the dialog manager 40 with script 50. The hub 10 also controls the data flow between various modules. The dialog manager 40 may communicate with the backend 60 either directly or through the hub 10, the precise communication protocol may be set up at the time of initialization. Specifically, the hub 10 is responsive to speech from a telephone, for example, which is input to the system 4 as "input". "Input" is preferably speech input.

The hub 10 passes speech data to the speech recognizer 20 which in turn passes the recognized text back to the hub 10. The hub 10 then passes the recognized text to the natural language understanding unit 30 which passes a semantic representation of the recognized text back to hub 10. The hub 10 then passes the semantic representation to the dialog manager 40. The dialog manager 40 may communicate with the backend 60 zero, one, or many times to generate a response. The dialog manager 40 passes the response back to the hub 10. The hub 10 then passes the response to the text-to-speech synthesizer 70 and the resulting audio is sent over the telephone back to the user as "output", preferably synthesized speech.

It should be understood that the present invention focuses on the dialog manager 40 and the script 50. As a result, the respective functions associated with the hub 10, speech recognizer 20, the natural language understanding unit 30, the backend 60, and the text-to-speech synthesizer 70 may be performed by conventional units, known to those skilled in the art.

The function of the natural language understanding unit 30 may be implemented in any known manner, for example, by a statistical parser as disclosed in the publication by "A Linear Observed Time Statistical Parser Based on Maximum Entropy Models" by A. Ratnaparkhi, in Proceedings of the Second Conference on Empirical Methods in Natural Language Processing, August 1997, Providence, R.I., and incorporated herein by reference.

The semantic representation may be a bracketed expression as below:

[BUY [NULL i_null want_null to_null NULL] buy_buy [FUND-BUY FUND_fund-buy FUND-BUY] BUY]

where FUND stands for a group of English words such as "FIDELITY MAGELLAN", for example. The present invention is not limited to English, as any language may be used and further the present invention is not limited to stock trading and may be extended or implemented to any service or applications.

In the above example, English words (individual or pre-grouped words) are tagged (tags being "null", "buy", "fund-buy" in the example above) and then grouped together into subgroups which are labeled (labels being "NULL", "FUND-BUY" in the above example), and then these labels in turn are grouped to form higher-level constituents which are again labeled. There is only one higher-level constituent in the example with the label "BUY".

From the semantic representation, a list of (attribute, value) pairs is assembled. Some of the attributes such as labels from the above parse tree may be binary valued; such attributes typically represent abstract semantic concepts. Some of the attributes have concrete values like "FIDELITY MAGELLAN", "$1000", etc., and represent data fields necessary to perform a specific task.

Assembling the list of (attribute, value) pairs from a semantic representation may be performed by the natural language understanding unit 30, or assembling the list may also be performed by the dialog manager 40, provided that the dialog manager 40 knows enough about the semantic representation produced by the natural language understanding unit 30. From now on, it is assumed that the semantic representation includes a list of pairs, for example attribute/value pairs.

Focusing now on the dialog manager 40, it is to be appreciated that the dialog manager 40 of the present invention operates in conjunction with the script 50. The script 50 is a text file including a description of all the forms used by the dialog manager 40. The description is preferably given in a special declarative language interpreted by the dialog manager 40. A form includes a set of slots, an optional set of consistency conditions on slot values and a set of form-level messages. Every form has a name. A form may also have a list of donor forms associated with it. Each slot in turn includes a list of attributes that match the slot, an optional list of donor slots, an optional default value, and an optional list of slot-level messages. Every message has an ultimate target: either the user or the backend. However, a message may be intercepted and interpreted further by the hub 10 before reaching its ultimate target.

All messages (either at slot-level or at form-level) are described in the script by text templates. Message construction by the dialog manager 40 involves interpolating variables, evaluating some standard functions provided by the dialog manager, and finally producing a piece of text to be passed to the target of the message, the target ultimately being the user or the backend 60. An example of message construction is provided below:

Message template: "how much of $FUND-BUY do you want to buy?"

This message template involves variable interpolation, the variable being a slot. If the slot happens to include "FIDELITY MAGELLAN", the following is the final text that is generated:

"how much of Fidelity Magellan do you want to buy?"

Another example of a message template is shown below:

"how much of $FUND-BUY do you want to buy? &Clear ($FUND-SELL)"

This message template has a function evaluation which results in a side effect and a variable interpolation. Message construction using this template will clear the slot named FUND-SELL and generate the following text (again assuming FUND-BUY is filled with "FIDELITY MAGELLAN"):

"how much of FIDELITY MAGELLAN do you want to buy?"

It is to be understood that message templates in the form script 50 may include any number of functions known to or defined by the dialog manager 40. Many possibilities for the functions of the dialog manager are contemplated. These functions may create only side effects or generate text or do both. By writing appropriate messages, the application programmer may not only prescribe what will be presented to the user or another component of the conversational system, but also control what forms will be enabled or disabled or cleared upon sending the message.

The messages are labeled as "BE-message" or DM response in FIG. 1. The dialog manager 40 selects a message depending on its label and the context. For example, a form-level message labeled "HelpMsg" will be selected by the dialog manager when the user requests help on the task corresponding to that form. The specification of the task in a help request may be implicit or explicit. This means access to the help request may be selected by the user or initiated by system 4. A slot-level message labeled "Prompt", for example, will be selected by the dialog manager when the dialog manager decides that the slot's value should be obtained from the user.

Backend "messages" (slot-level or form-level messages whose target is the backend 60) encode the task to be performed by the backend 60. The backend 60 attempts to perform the task described in the "message", and returns with a return code. Each backend message is therefore associated with a set of return-codes. Each return code is associated with an optional list of forms to be enabled (made admissible), an optional list of forms to be disabled (made inadmissible), an optional list of forms/slots to be cleared, and a message-to-user reporting the status back to the user. The latter message will be referred to as an "rc message" later. In essence, when the dialog manager 40 generates the rc message, the state of the dialog manager may change in a way the application developer prescribes.

Each form described in the script 50 is a template used by the dialog manager 40 to dynamically create (instantiate) objects storing relevant information about the task that the form corresponds to. At the time of initialization, the dialog manager 40 creates one object per form in the script 50. The collection of forms thus created becomes the "current set of forms".

The dialog manager 40 also maintains a list of the forms that are currently admissible. The initial list of admissible forms is specified in the script 50. For example, users cannot transfer money between their accounts before they log in. The script corresponding to any banking application is expected to have only one form, namely, the LOGIN form, that is initially admissible. Other forms in the application such as BALANCE-QUERY, WITHDRAW, TRANSFER forms are initially inadmissible. The application developer has control over not only what is initially admissible, but also over what tasks are admissible at various stages of dialog: for example, the application developer may specify that BALANCE-QUERY, WITHDRAW, TRANSFER become admissible after a LOGIN form is successfully completed. If the application developer so prefers, he/she may alternatively specify in the script file that only BALANCE-QUERY is admissible after LOGIN and WITHDRAW, TRANSFER become admissible after the BALANCE-QUERY form is at least once successfully completed.

The list of admissible forms also plays a role in dynamically adapting the mode of dialog (machine-initiative/directed-dialog versus mixed-initiative/free-flow dialog) to the flow of conversation. By suitably expanding or contracting the list of admissible forms, the dialog manager operates in machine-initiative mode or in mixed-initiative mode. In machine-initiative mode, once the user addresses a task the dialog manager 40 reduces the list of admissible forms to only the current task. This means that the user cannot switch tasks until the current task is completed or until he/she explicitly cancels out of it.

The dialog manager also maintains a store of messages to be sent to the user via the hub 10. At the end of its turn, the dialog manager 40 concatenates the messages in the message store and sends them to the hub 10 for further interpretation and delivery to the user. For example, at the end of a turn, the message store may contain two messages in the following order: 1. Say "transfer complete". 2. Say "what else can I do for you?". The dialog manager concatenates these two messages and sends the messages to the hub. The hub 10 synthesizes "transfer complete. what else can I do for you?" and plays it back to the user. The message store is referred to as "output message store" or "output store" in FIGS. showing the block/flow diagrams for dialog management below.

The script 50 also specifies in which of two dialog modes (directed or free-flow) the dialog manager 40 is to start. The dialog manager 40 also maintains a chronological list of forms that were selected as the target of each turn of the user.

Figure 2:
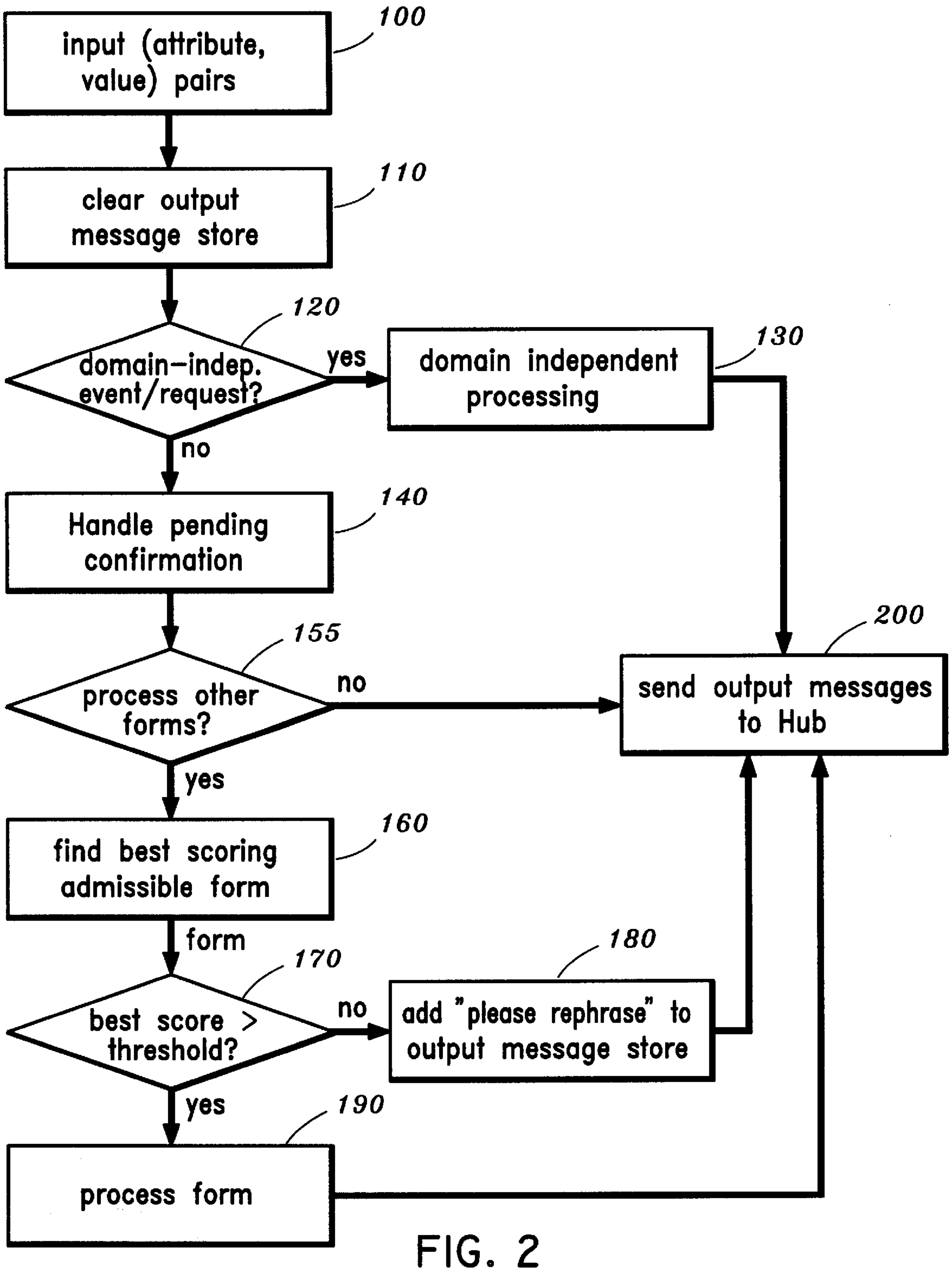
FIG. 2 is a block/flow diagram showing dialog management in accordance with the present invention.

Referring to FIG. 2, a block/flow diagram is shown for a preferred dialog management system/method. In block 100, the list of (attribute, value) pairs is input to the dialog manager of the invention. It is to be understood these (attribute/value) pairs are stored in a dialog manager's memory and are available to all subsequent blocks. In block 110, the output message store is cleared. In block 120, it is determined whether there is a domain-independent event/request to be addressed. If there is, the event/request is taken care of in block 130, which adds an output message to the output message store and then the messages are sent to the hub in block 200. If there is no domain independent request/event, any pending form-level confirmations are handled in block 140. Block 140 may add an output message to the output message store.

In block 155, it is determined whether to process forms further or not. If not, the output messages are sent to the hub in block 200. If there is a need to process forms further, all currently admissible forms are scored in block 160. In block 170, it is determined whether the score of the highest scoring form of block 160 is higher than a minimum acceptable threshold or not. If not, a message of the type "I do not follow you, please rephrase your question" is added to the output message store in block 180 and the output messages are sent to the hub in block 200. If the score of the highest scoring form is higher than a minimum acceptable threshold, in block 190, the best scoring form is processed. Block 190 adds a message to the output message store, modifies the list of admissible forms, and modifies the dialog-mode. Then, in block 200, the output messages in the output message store are sent to the hub.

Figure 3:
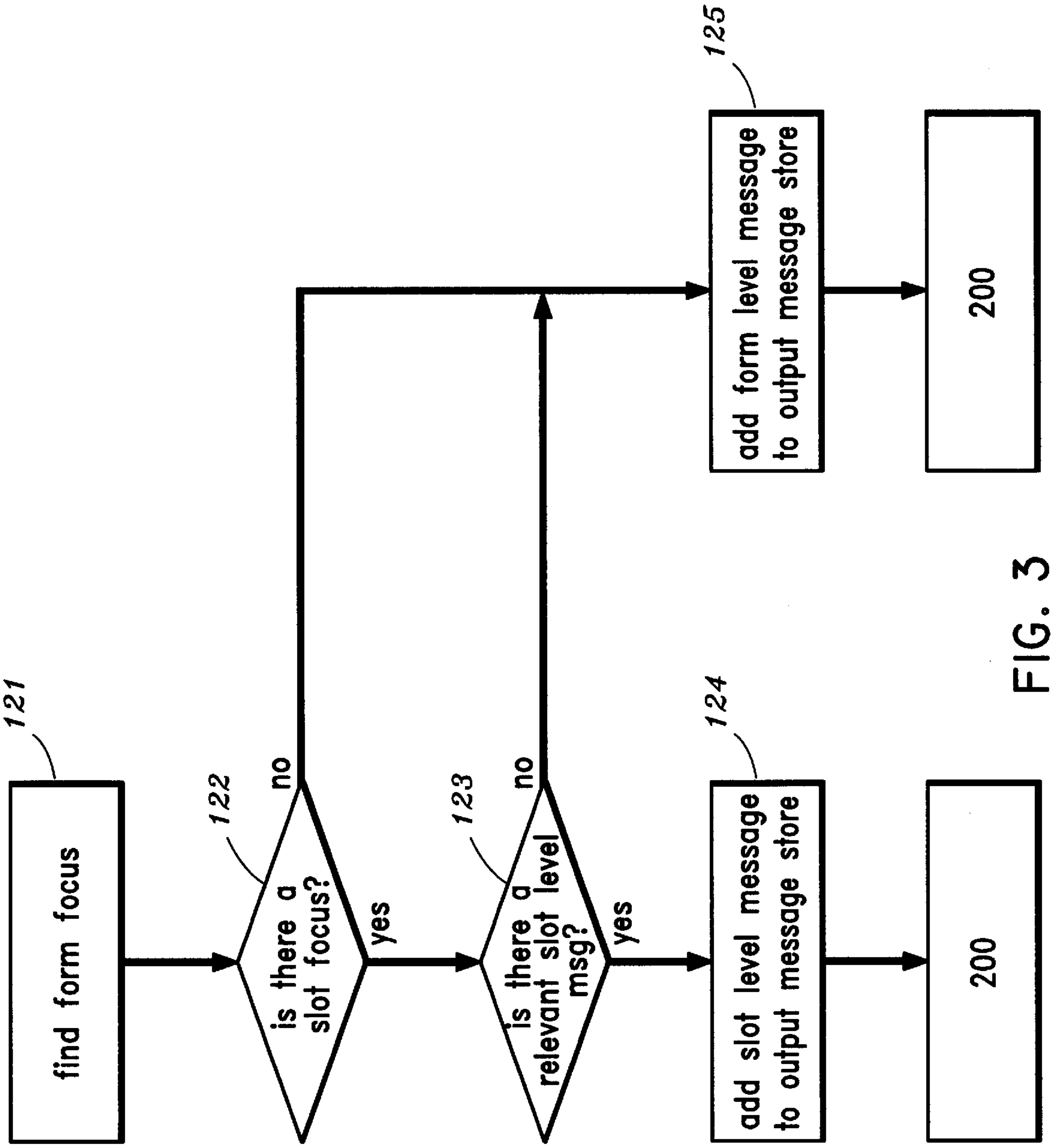
FIG. 3 is a block/flow diagram showing in greater detail domain-independent processing as provided in FIG. 2 in accordance with the present invention.

Referring to FIG. 3, a domain-independent event/request processing in block 120 of FIG. 2 is described in greater detail. In block 121, a current form focus is determined. In block 122, it is determined if there is a slot focus in the currently focused form. If there is a slot focus, in block 123 it is determined if there is a relevant slot-level message corresponding to the event/request. If there is a relevant slot-level message, in block 124 the relevant slot-level message is generated and added to the output message store, and the output messages are sent to the hub in block 200. If there is no relevant slot-level message or if there is no slot focus, the relevant form-level message is generated and added to the output message store in block 125, and the output messages are sent to the hub in block 200.

Figure 4:
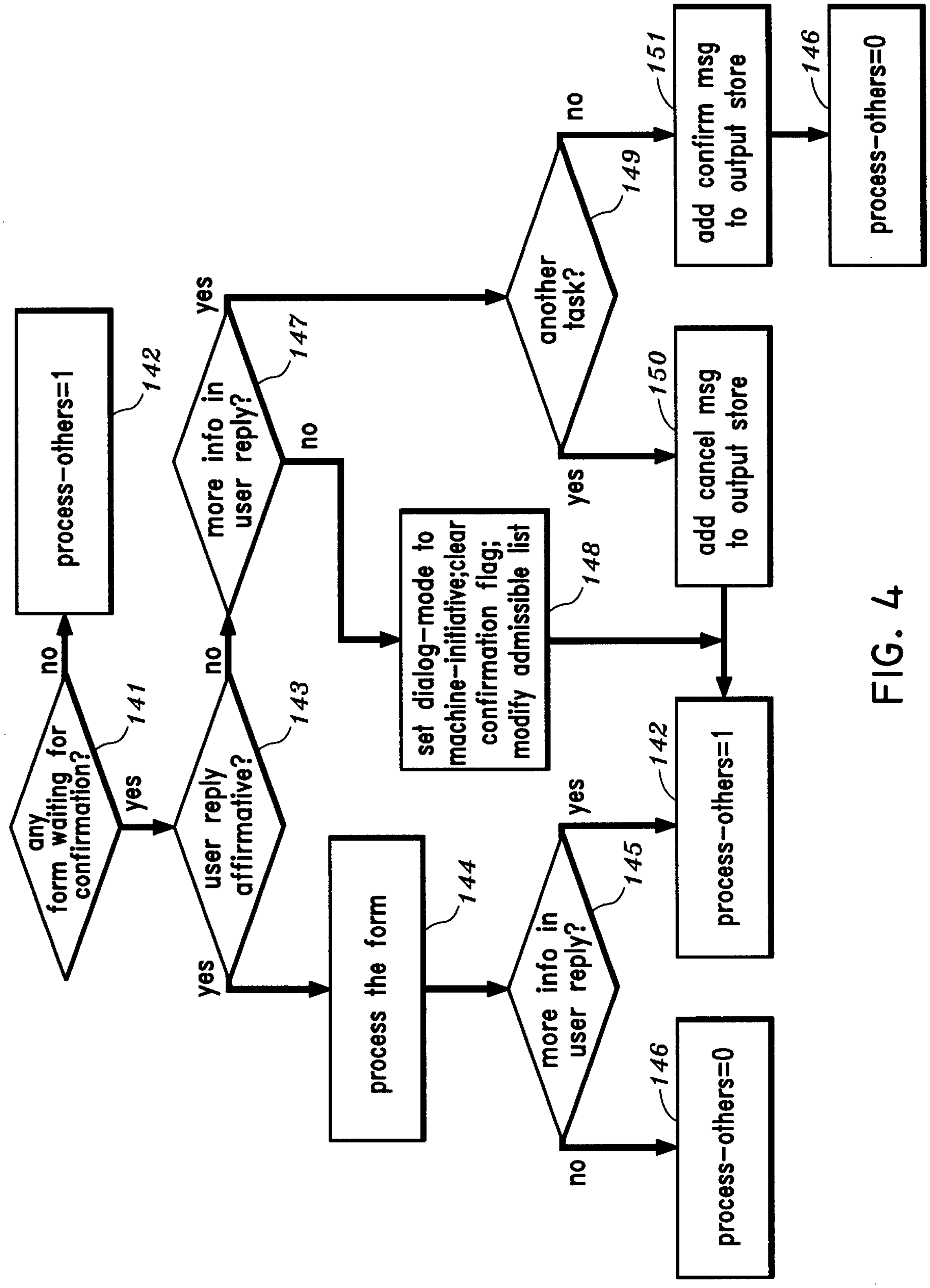
FIG. 4 is a block/flow diagram showing, in greater detail, handling pending confirmation processing as provided in FIG. 2 in accordance with the present invention.

Referring to FIG. 4, the handling of a pending confirmation in block 140 of FIG. 2 is described in greater detail. In block 141, it is determined if there is any form waiting for task confirmation from the user. If no, process-further flag is set in block 142 which is then checked in block 155 of FIG. 2. If yes, in block 143, it is verified if the response is affirmative. If yes, the form waiting for confirmation is processed in block 144 and it is determined in block 145 if the user stated additional tasks. If user stated additional tasks the process-further flag is set which is then checked in block 155 of FIG. 2, else the process-further flag is cleared which is then checked in 155 of FIG. 2. If the users response is negative, it is determined in block 147 if user's response has additional information. If no, the current dialog mode and the current list of admissible forms are stored away, and the dialog mode is set to machine-initiative. The admissible list is contracted to include just the current form waiting for confirmation, and the confirmation-message-sent flag of the current form is cleared in block 148. This is then followed by block 142.

If the user supplied additional material in his/her negative reply, it is determined in block 149 if the user stated another task. If yes, in block 151 a "canceled message" is generated from the current form waiting for confirmation and added to the output message store and then control passes to block 142. If user did not state another task, a reconfirmation message is sent from the current form waiting for confirmation and is added to the output message store, and then control passes to block 146.

Figure 5:
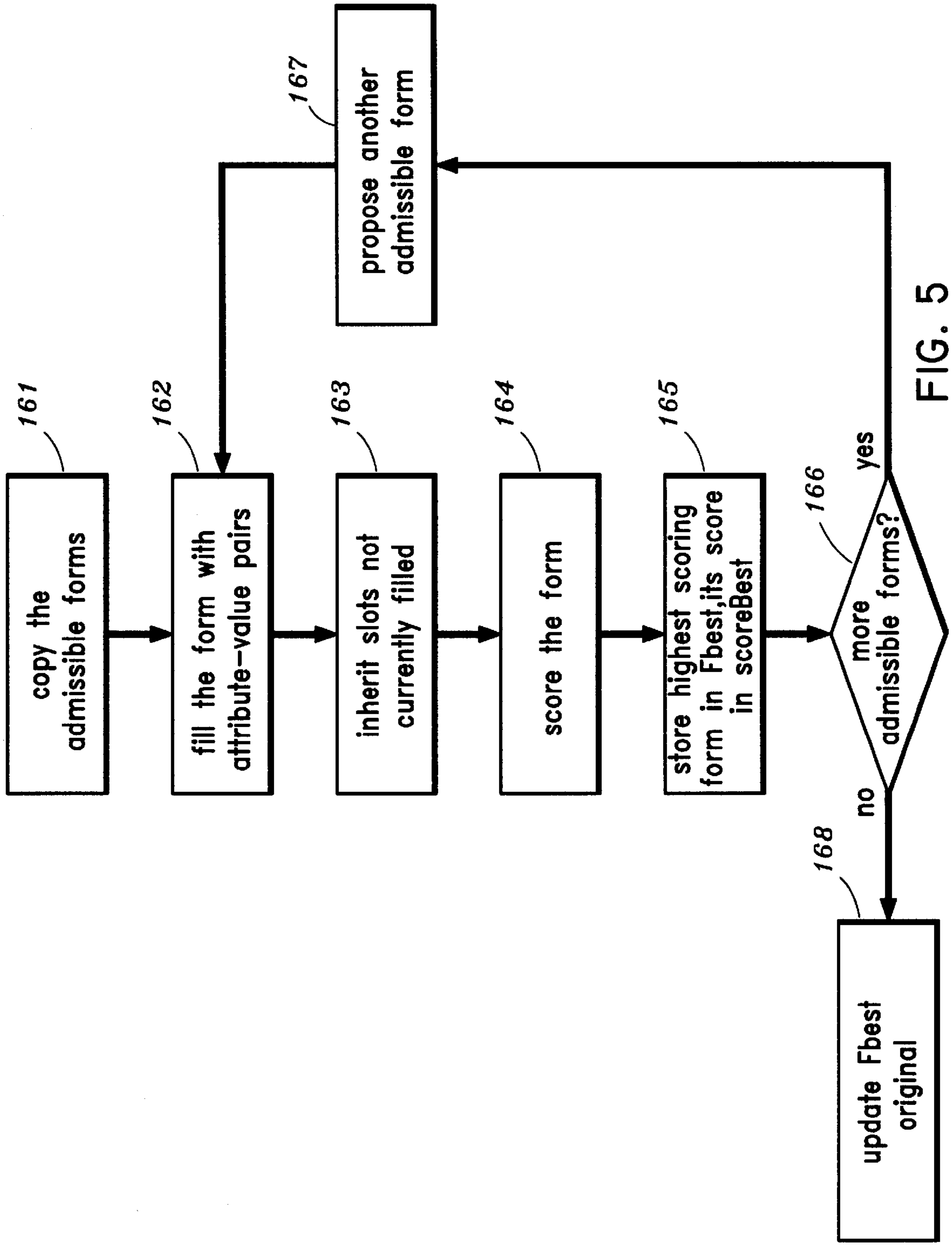
FIG. 5 is a block/flow diagram showing, in greater detail, finding the best scoring form of all admissible forms as provided in FIG. 2 in accordance with the present invention.

Referring to FIG. 5, block 160 (finding the best scoring form of all admissible forms) of FIG. 2 is shown in greater detail. In block 161, admissible forms are copied. In block 162, the currently proposed form is filled with values corresponding to matching attributes. Also in block 162, the number of attributes not matching any of the slots of the form is counted and kept track of. In block 163, it is attempted to inherit values for slots that are not currently filled from a list of eligible donor forms and eligible slots within the donor forms. In block 164, a score is associated with the form based on, among other things, how many of its slots are filled directly from the input (attribute, value) pairs, how many of its slots were filled by inheritance, how many of its slots are filled with default values, how may of its slots are empty, and how many of the input attributes did not match any of the slots. The scoring function provides that a form scores higher if more slots are filled and unfilled slots are penalized with penalties depending on whether a slot stands for a concrete data field or an abstract concept.

In block 165, the highest scoring form is stored in Fbest and its score in bestscore. In block 166, it is determined whether there are any more admissible forms to be stored. If yes, in block 167 the next unscored admissible form is proposed to block 161. If no more forms are to be scored Fbest is updated in block 168. The best scoring form Fbest and its bestscore are passed to block 170 of FIG. 2.

Figure 6:
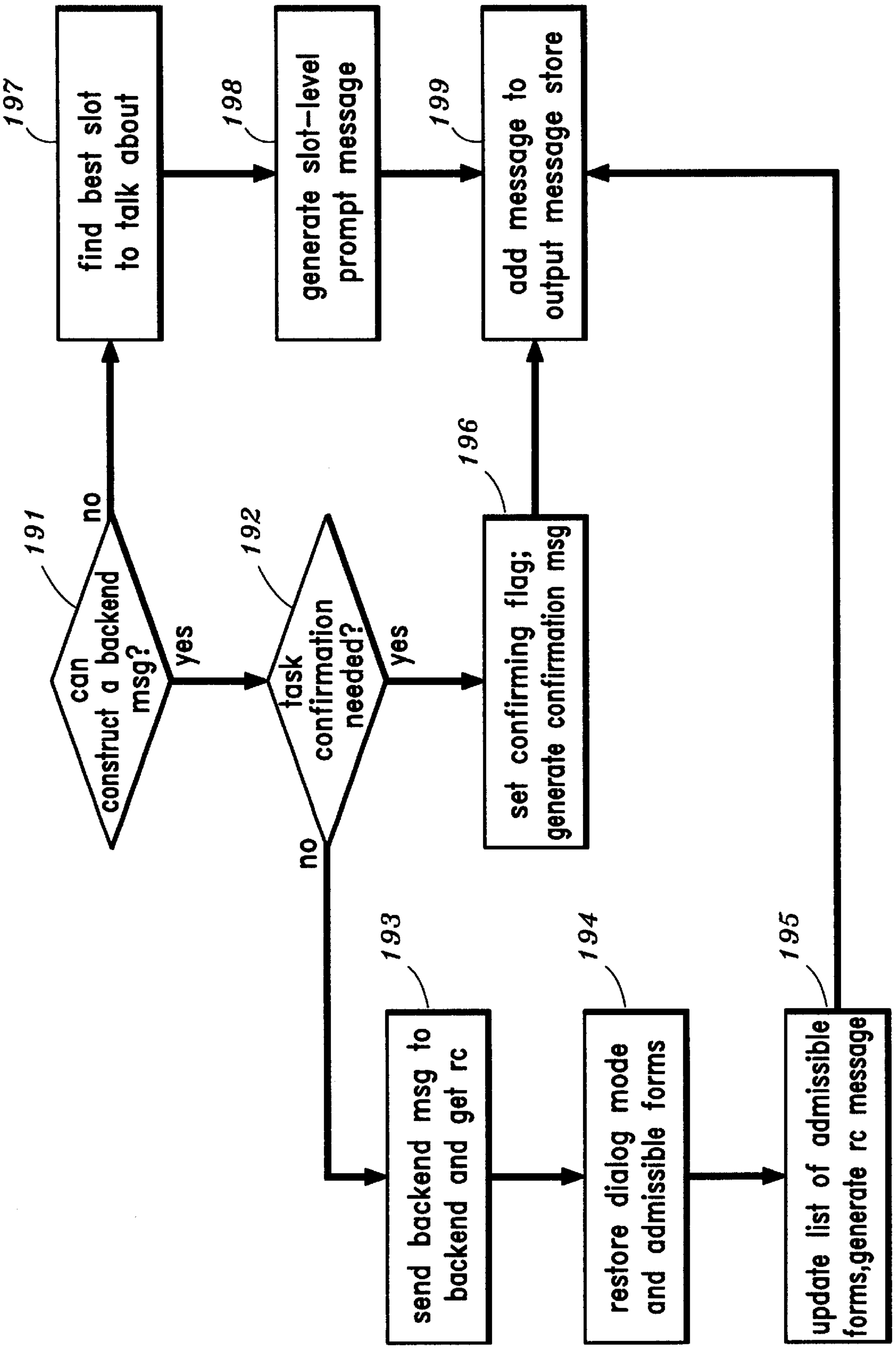
FIG. 6 is a block/flow diagram showing, in greater detail, processing a form to generate a message to be sent to the user as provided in FIG. 2 in accordance with the present invention.

Referring to FIG. 6, the procedure of processing a form to generate system response (block 190 of FIG. 2) is described in greater detail. In block 191, it is determined whether a backend message can be constructed (i.e. all slots needed for a backend message are filled.) If no, in block 197 the best slot to talk about is selected (which may simply be the first slot in the form that is not uniquely filled; but other variations are possible). In block 198, a prompt from the slot thus selected, in block 197, is generated, which is then added in block 199 to the output message store.

If in block 191, it turns out that a backend message can be constructed, then in block 192 it is determined whether a task confirmation is needed from the user for that transaction (a task confirmation is needed for a transaction if the form script has a "Confirm Msg" associated with the backend message). If yes, in block 196 a flag in the form set that remembers that a confirmation message is sent from the form, the confirmation message is generated, which is then added to the output message store in block 199.

If in block 192 it turns out that a task confirmation is not needed from the user, then in block 193, a backend message is generated and sent to the backend. In block 194, the dialog mode (machine-initiative versus mixed-initiative) is restored along with the list of admissible forms. In block 195, the return code from the backend is examined and based on the return code the list of admissible forms is updated, and a return code status message summarizing the status of the backend task execution is generated. In block 199, this status message is added to the output message store.

In accordance with the present invention, a dialog manager is provided which permits a more versatile interface for interacting with users. The domain of tasks is significantly increased by providing a plurality of different forms with which to collect information from a user. Also, a wider range of information may be supplied to a user. Although described in terms of a telephony system, the present invention finds utility in many applications, for example, voice controlled machines/appliances, control systems, etc. Advantageously, the present invention uses a scoring method to determine the intent of the user to provide appropriate responses and to tender appropriate information.

Additionally, the present invention employs a natural language interface making the present invention more user friendly.

Having described preferred embodiments of natural language task-oriented dialog manager and method (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

Appendix A: sample script segment

```
# Lines beginning with pound (#) sign are comment lines
#_______________________#
\begin{form}LOGIN
\begin{slots}
\slotSIGNIN
\slotCID
# the following is the list of attributes that match this #
slot
        ^ AlsoMatchedBy: customer-id account-num
#when this slot is empty, the dialog manager sends one of
# the following
#messages: (prompt for missing information)
        \begin{messages}
            \msg Prompt: Say "what is your account number?";
            \msg Prompt: Say "please specify your account
number";
        \end{messages}
\end{slots}
#now follow form-level messages:
#
\begin{messages}
            \msg HelpMsg: Say "you can say or enter your
account number.";
        \msg CancelMsg: Say "login attempt canceled.";
        \msg StuckRecord: Operator "transferring you to an
operator.";
#Every form corresponds to a specific task the user wants to
#perform, and has a message describing the action.
#This message, labeled BEMsg, will be sent to the "backend"
#
#
#The backend tries to perform the task described in the
# message,
# and returns with a return code. Depending on the return-
# code,
# the system does a number of things including calling some
# functions
# that change the state of the dialog manager and playing a
# prompt.
# There can be a lot of return codes, so there is a return-
# code list
# called "rclist".
#
            \msg BEMsg:BEProcess {VERIFY ~CID:$CID}
            \begin{rclist}
        \rc FAIL\msgPrompt: Say "unable to verify.try again.";
        \rc OK \msgPrompt: Say "you are verified.";\
                &Enable(BUY BALANCE NAV) &Disable(SIGNIN)
        \end{rclist}
        \msg UnknownReturnCode: Operator "transfer you to an
operator.";
\end{messages}
\end{form}
#_______________________#
\begin{form}BUY ^ Inherit:BALANCE NAV
\begin{slots}
\slot BUY ^ AlsoMatchedBy: buy
    \slot FUND-BUY
```

-continued

Appendix A: sample script segment

```
        ^ AlsoMatchedBy; fund-buy fund-gen
        ^ Inherit: FUND-GEN FUND-SELL
        \begin{messages}
            \msg Prompt: Say "buy which fund?";
            \msg Prompt: Say "$AMOUNT of which fund do you
want to buy?";
        \msg ConfirmMsg: Say: do you want to buy $FUND-BUY?";
            \msg BEMsg: BEProcess { DISAMBIGUATE~CID:
%SIGNIN.$CID\~FUND-BUY: $FUND-BUY. ^ utt}
        \begin{rclist}
        \rc NONE\msg Prompt: Say "there is no fund called\
                $FUND-BUY ^ utt"; & Clear ($FUND-BUY)
        \rc SOME\msg Prompt: Say "do you want to buy\
                &PrefixConcat ($FUND-BUY)?";
        \rc LOTS\msg Prompt: Say "there are over&Size($FUND-
BUY)\
                such &Prefix($FUND-BUY)funds.please be more\
                specific about $FUND-BUY. ^ utt";
            \end{rclist}
        \end{messages}
\slot AMOUNT
        ^ AlsoMatchedBy: d-amount
        \begin{messages}
        \msg Prompt: Say "buy how much?";
        \msg Prompt: Say "how much of $FUND-BUY do you want to
buy?";
        \msg ConfirmMsg: Say "want to buy shares worth
$AMOUNT?";
        \end{messages}
\end{slots}
## form-level messages follow now.
\begin{messages}
    \msg ConfirmMsg: Say: "confirming purchase of $AMOUNT of\
                $FUND-BUY .please say yes or no";
    \msg CancelMsg: Say "purchase attempt canceled";
    \msg HelpMsg: say "purchase requires the name of the fund
you want to\ buy and an amount.";
    \msg HelpMsg: switch &Size($FUND-BUY) one {Say "you said
you wanted to\purchase $FUND-BUY. you also need to specify
an amount.";}\default {Say "you said you wanted to purchase
a fund.\however, i am not sure of the fund you want to
buy.\there are over &Size ($FUND-BUY) funds matching
your\description. please say the full name of the fund.";}
    \msg StuckRecord: Say "i have trouble following
you.cancelling this\buy transaction.";
    \msg BEMsg: PURCHASE~CID:%SIGNIN.$CID~FUND_BUY:\
            $FUND-BUY. ^ key~AMOUNT:$AMOUNT}
        \begin{rclist}
            \rc OK\msg Prompt: Say "purchase complete";
        \rc FAILED\msg Prompt: Say "you don't have enough
cash";\ &Clear ($AMOUNT)
        \end{rclist}
    \msg UnknownReturnCode: Say: unable to process this buy
request.";
\end{messages}
\end{form}
#_______________________#
```

APPENDIX B

The following is a transcript of an actual telephone dialog between the present invention's dialog manager and a human. There was no editing done except for the purpose of pretty-printing the dialog (line breaks are deleted) and comments are added in parentheses.

Computer: Welcome to the IBM Mutual Fund Voice System. To interrupt this prompt. press the star key. in this demo you can buy, sell or transfer between funds, you can inquire about your portfolio, about the price of any fund, or about balance of any fund in your portfolio. At any time during the demo you can say help for more information on using the demo. You can also say cancel to stop your current request. This system provides price quotes for over eight five hundred mutual funds. Please note that the quotes provided in this demo are not guaranteed to be up to date. Do not use this demo for financial decision making. Please tell me your account number Human: nine five five two nine three nine Computer: you are verified. do you want to buy, sell, transfer, get price quotes, or inquire about your portfolio Human: give me the price of fidelity magellan Computer: price is ninety four dollars seventy four cents for fidelity magellan. what else can i do for you Human: how about the vanguard index Computer: there are over nine such vanguard index trust funds. listing the first three funds. do you want price of vanguard index trust, extended market, extended market institutional shares, of five ("price" task from context & clarification)

Human: the next five funds please (navigation by speech)

Computer: vanguard index trust, growth, small cap stock, small cap stock institutional shares, total stock market, or total stock market institutional shares Human: the last one (selection by speech)

Computer: price is twenty one dollars thirty three cents for vanguard index trust total stock market institutional shares. what else Human: i want to buy one hundred shares (fund name not specified)

Computer: confirming purchase of one hundred Shares of vanguard index trust total stock market institutional shares. please say yes or no (fund name from context)

Human: no make it one thousand dollars (repair or change of mind)

Computer: confirming purchase of one thousand dollars of vanguard index trust total stock market institutional shares. please say yes or no Human: okay also give me the price of founders blue chip (confirmation and new request)

Computer: purchase complete. price is seven dollars thirty one cents for founders blue chip. what else Human: i want to transfer from fidelity magellan fund Computer: transfer to which fund (querying for missing information)

Human: the vanguard index

Computer: there are over nine such vanguard index trust funds. listing the first three funds. do you want to transfer to vanguard index trust, extended market, extended market institutional shares, or five hundred (clarification)

Human: my index five hundred fund (refinement of previously supplied information)

Computer: transfer how much

Human: how much do i have in my fidelity magellan ("natural dialog" allows diversions)

Computer: you have ten thousand dollars in fidelity magellan. what else

Human: i would like to transfer five thousand dollars

Computer: confirming transfer of five thousand dollars from fidelity magellan to vanguard index trust fund five hundred. please say yes or no (successfully continued transfer transaction)

Human: no

Computer: you can cancel transfer operation altogether, or change transfer information. do you want to continue with transfer please say yes or no only Human: yes Computer: do you want to transfer from fidelity magellan (dynamic switching to Directed Dialog mode)

Human: no

Computer: transfer from which fund (computer is in control directing the dialog)

Human: no (human did not cooperate)

Computer: from which fund would you like to transfer five thousand dollars to vanguard index trust five hundred (prompt became more elaborate)

Human: from fidelity select technology

Computer: do you want to transfer from fidelity select technology portfolio

Human: okay

Computer: do you want to transfer to vanguard index trust five hundred

Human: no make that fidelity puritan

Computer: do you want to transfer to fidelity puritan

Human: okay

Computer: do you want to transfer five thousand dollars

Human: okay

Computer: confirming transfer of five thousand dollars from fidelity select technology portfolio to fidelity puritan. please say yes or no Human: okay Computer: transfer complete. what else (dynamic switching back to Natural Dialog mode)

Human: what do i have in my portfolio

Computer: you have nineteen thousand dollars in cash, ten thousand dollars once cent in fidelity magellan, five thousand dollars in fidelity puritan, two thousand dollars one cent in vanguard index trust five hundred, and one thousand dollars in vanguard index trust total stock market institutional shares. what else Human: i want to sell all of my fidelity select technology (user doesn't own this fund)

Computer: do you want to sell fidelity, magellan, or puritan (clarification)

Human: i mean fidelity magellan

Computer: confirming sale of one hundred percent of fidelity magellan. please say yes or no Human: okay Computer: sale complete. what else Human: goodbye Computer: Thank you. goodbye Call terminates with HANGUP

What is claimed is:

1. A system for conversant interaction comprising:

a recognizer which receives and processes input information and outputs a recognized representation of the input information;

a dialog manager coupled to the recognizer, the dialog manager receives the recognized representation of the input information, the dialog manager having task-oriented forms for associating user input information therewith, the dialog manager being capable of selecting an applicable form from the task-oriented forms responsive to the input information by scoring the forms relative to each other; and a synthesizer converts a response generated by the dialog manager to output the response.

2. The system as recited in claim 1, wherein the dialog manager is controllable through a backend and a script for determining a behavior for the dialog manager.

3. The system as recited in claim 1, wherein the recognizer includes a speech recognizer for recognizing speech and outputting recognized text.

4. The system as recited in claim 3, wherein the recognized text is output to a natural language understanding module for interpreting natural language supplied through the input.

5. The system as recited in claim 3, wherein the synthesizer is a text to speech synthesizer.

6. The system as recited in claim 1, wherein the task-oriented forms each correspond to a different task in an application, each form including a plurality of fields for receiving data supplied by a user at the input, the fields corresponding to information applicable to the application associated with the form.

7. The system as recited in claim 1, wherein scoring the forms relative to each other is provided according to information needed to complete each form and the context of information input from a user.

8. The system as recited in claim 1, wherein the dialog manager includes means for formulating questions for one of prompting a user for needed information and clarifying information supplied by the user.

9. The system as recited in claim 1, wherein the dialog manager includes means for confirming information supplied by the user.

10. The system as recited in claim 1, wherein the dialog manager includes means for inheriting information previously supplied in a different context for use in a present form.

11. A program storage device readable by machine, tangibly embodying a program of instructions executable by the machine to perform method blocks for managing dialog for speech recognition systems, the method blocks comprising:

- assembling attributes and values in pairs based on a semantic representations of input speech;
- processing semantic representations to determine a plurality of admissible forms in accordance with pairs of attributes and values;
- scoring the admissible forms to determine which form is most relevant and responsive to the pairs of attributes and values and thereby being responsive to input speech; and
- sending messages to be output in accordance with the input speech and the context of the input speech in accordance with the most relevant form.

12. The program storage device as recited in claim 11, wherein the forms include slots for receiving information therein and the step of scoring the admissible forms includes the step of scoring the admissible forms based on a number of filled and unfilled slots.

13. The program storage device as recited in claim 11, wherein the step of sending messages includes the step of sending confirmation messages to a user prior to executing a task.

14. The program storage device as recited in claim 11, wherein the device includes a domain of relevant forms and further comprising the step of determining whether the input speech is domain independent and responding to the user with relevant information.

15. The program storage device as recited in claim 11, futher comprising the step of comparing a score of the most relevant and responsive form to a threshold value to determine if input speech is properly received.

16. The program storage device as recited in claim 15, further comprising the step of sending a message to a user to rephrase the input speech.

17. The program storage device as recited in claim 11, wherein input speech and output messages are in natural language.

18. The program storage device as recited in claim 11, further comprising the step of inheriting the pairs of attributes and values from previously filled slots of previously most relevant and responsive forms based on context of input speech.

19. The program storage device as recited in claim 11, further comprising the step of enabling a user to shift context naturally allowing the user to address any task at any time during operation of the device.

20. The program storage device as recited in claim 11, further comprising the step of dynamically switching between machine-initiative and mixed-initiative modes by managing a list of admissible forms.

21. The program storage device as recited in claim 11, further comprising the step of canceling by speech input at any time at least one of a current transaction and any previous transaction.

22. The program storage device as recited in claim 11, further comprising the step of providing a context-sensitive help function accessible during operation of the device.

23. The program storage device as recited in claim 11, further comprising the step of providing a user with a capability for navigating lists of items presented to the user in response to input speech.

24. A method for managing dialog for speech recognition systems comprising the steps of:

- assembling attributes and values in pairs based on a semantic representations of input speech;
- processing semantic representations to determine a plurality of admissible forms in accordance with pairs of attributes and values;
- scoring the admissible forms to determine which form is most relevant and responsive to the pairs of attributes and values and thereby being responsive to input speech; and
- sending messages to be output in accordance with the input speech and the context of the input speech in accordance with the most relevant form.

25. The method as recited in claim 24, wherein the forms include slots for receiving information therein and the step of scoring the admissible forms includes the step of scoring the admissible forms based on a number of filled and unfilled slots.

26. The method as recited in claim 24, wherein the step of sending messages includes the step of sending confirmation messages to a user prior to executing a task.

27. The method as recited in claim 24, includes a domain of relevant forms and further comprising the step of determining whether the input speech is domain independent and responding to the user with relevant information.

28. The method as recited in claim 24, further comprising the step of comparing a score of the most relevant and responsive form to a threshold value to determine if input speech is properly received.

29. The method as recited in claim 28, further comprising the step of sending a message to a user to rephrase the input speech.

30. The method as recited in claim 24, wherein input speech and output messages are in natural language.

31. The method as recited in claim 24, further comprising the step of inheriting the pairs of attributes and values from previously filled slots of previously most relevant and responsive forms based on context of input speech.

32. The method as recited in claim 24, further comprising the step of enabling a user to shift context naturally allowing the user to address any task at any time.

33. The method as recited in claim 24, further comprising the step of dynamically switching between machine-initiative and mixed-initiative modes by managing a list of admissible forms.

34. The method as recited in claim 24, further comprising the step of canceling by speech input, at any time, at least one of a current transaction and any previous transaction.

35. The method as recited in claim 24, further comprising the step of providing a context-sensitive help function accessible.

36. The method as recited in claim 24, further comprising the step of providing a user with a capability for navigating lists of items presented to the user in response to input speech.

* * * * *